United States Patent [19]

Zelenetz

[11] Patent Number: 4,632,416
[45] Date of Patent: Dec. 30, 1986

[54] FLEXIBLE PROTECTIVE COVER FOR THE DRIVE TRAIN ELEMENTS OF A BICYCLE

[76] Inventor: Scott H. Zelenetz, 19 Waverly Pl., Lawrence, N.Y. 11559

[21] Appl. No.: 758,381

[22] Filed: Jul. 24, 1985

[51] Int. Cl.$^4$ .............................................. B62J 13/04
[52] U.S. Cl. .............................. 280/289 G; 280/152.2; 474/146
[58] Field of Search ............. 280/152.2, 152.3, 289 G; 474/146

[56] References Cited

U.S. PATENT DOCUMENTS

| 507,670 | 10/1883 | Bluemel | 474/146 |
| 557,267 | 3/1896 | Hadley | 280/152.2 |
| 594,694 | 11/1897 | Humphrey | 474/146 |
| 599,192 | 2/1898 | Parke et al. | 474/146 |
| 649,280 | 5/1900 | Dover | 474/146 |
| 732,536 | 6/1903 | Fisher | 474/146 |

FOREIGN PATENT DOCUMENTS

| 1200154 | 9/1965 | Fed. Rep. of Germany | 474/146 |
| 20460 | of 1894 | United Kingdom | 474/146 |
| 4368 | of 1897 | United Kingdom | 474/146 |

Primary Examiner—David M. Mitchell
Assistant Examiner—Mitchell J. Hill
Attorney, Agent, or Firm—Watson, Cole, Grindle & Watson

[57] ABSTRACT

A flexible protective cover for covering the drive train elements of a bicycle when the bicycle is not being used includes an elongated flexible panel part and a flexible skirt part, the elongated panel part including a generally cross-shaped opening through which the pedal attached to the right side of the crank arm of the bicycle drive train can pass and the skirt part including two generally U-shaped openings which can fit around two different parts of the bicycle. The skirt part also includes two elastic attachment bands which can be connected together to close the two generally U-shaped openings to fixedly attach the flexible protective cover to the bicycle.

14 Claims, 9 Drawing Figures

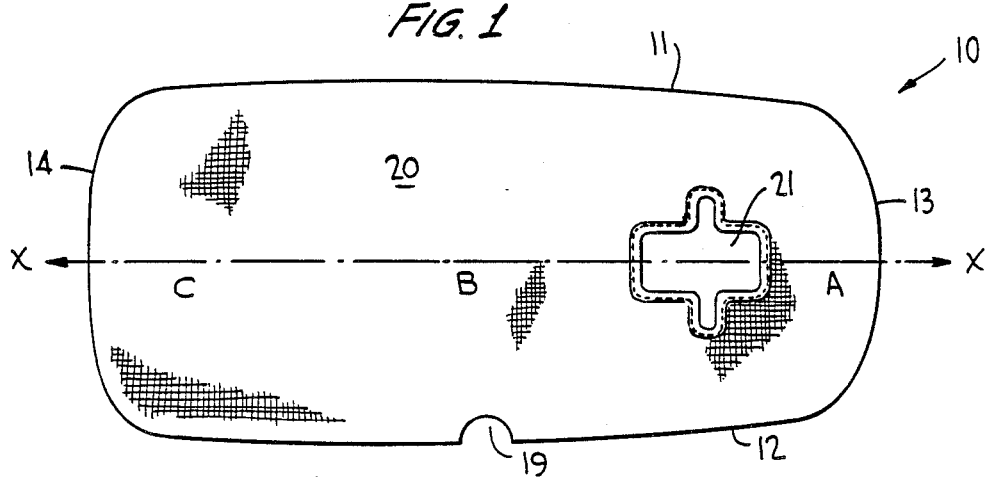
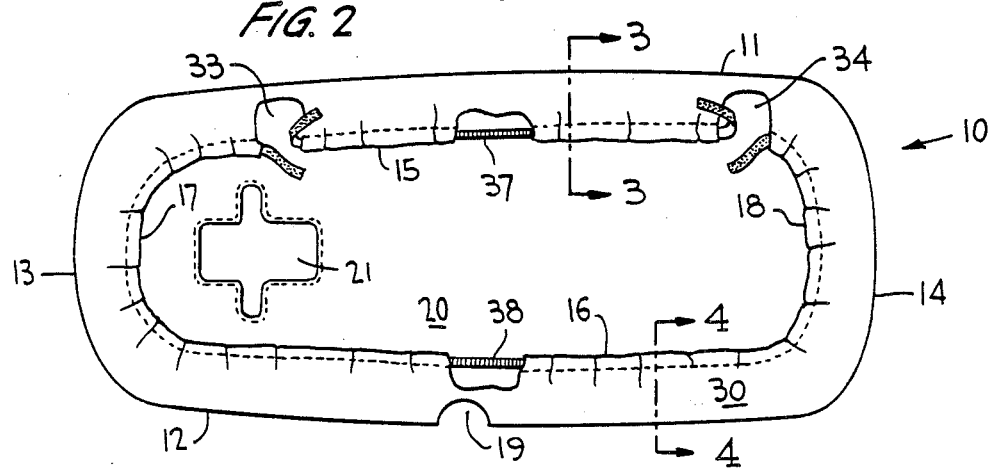
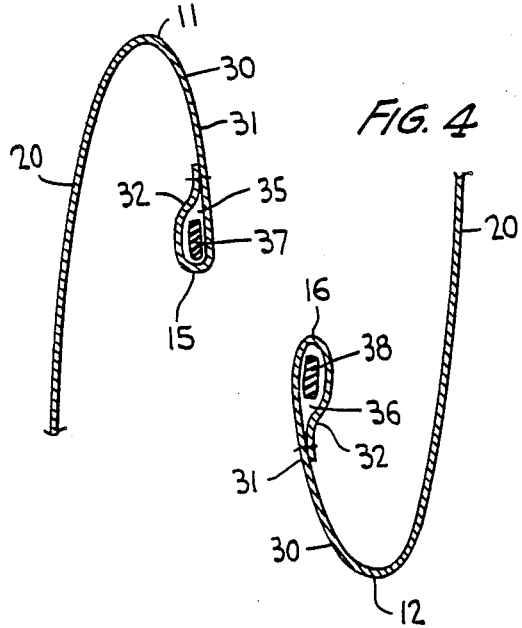
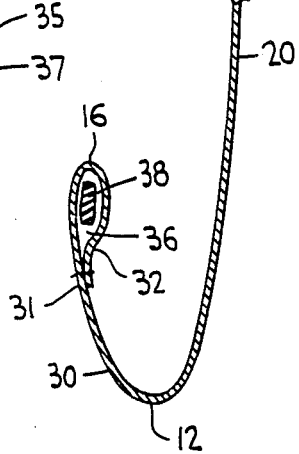
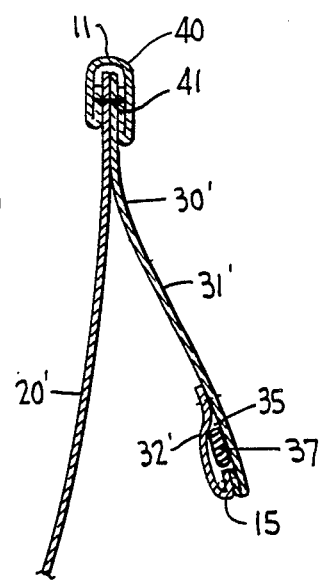
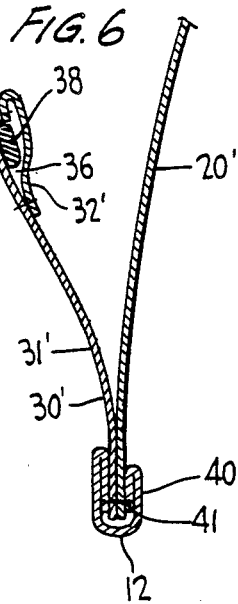

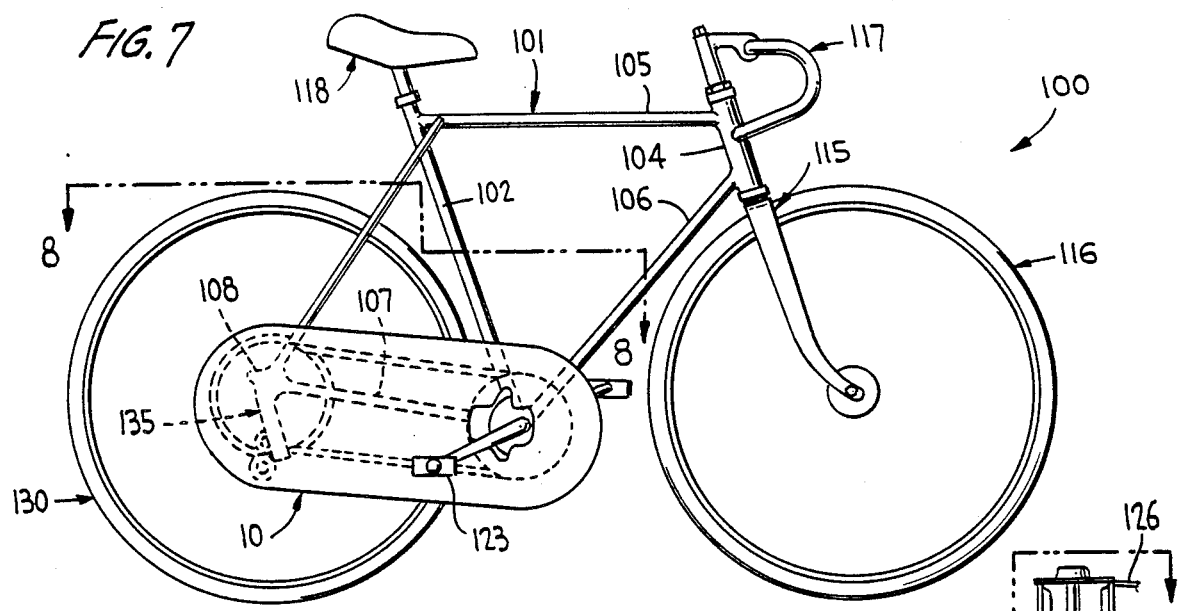
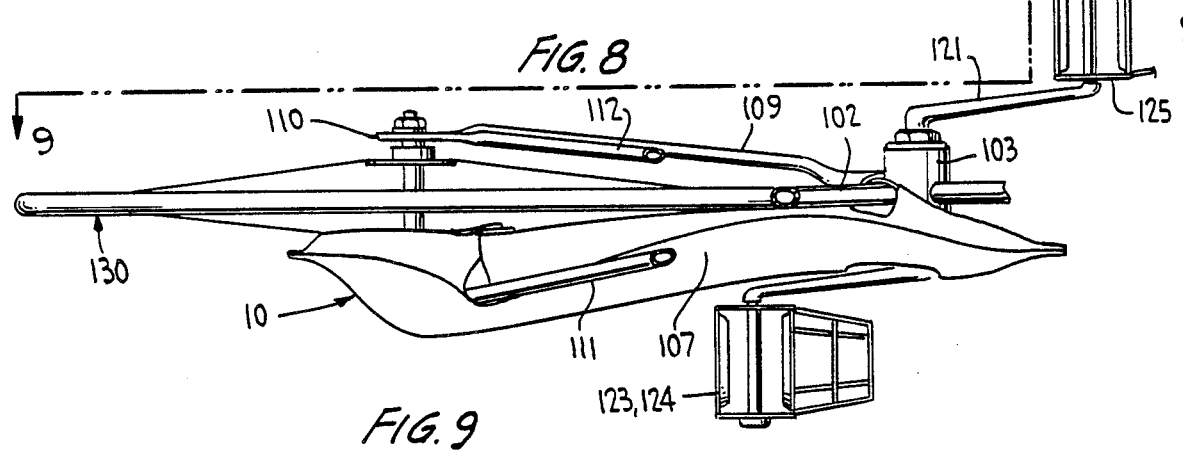
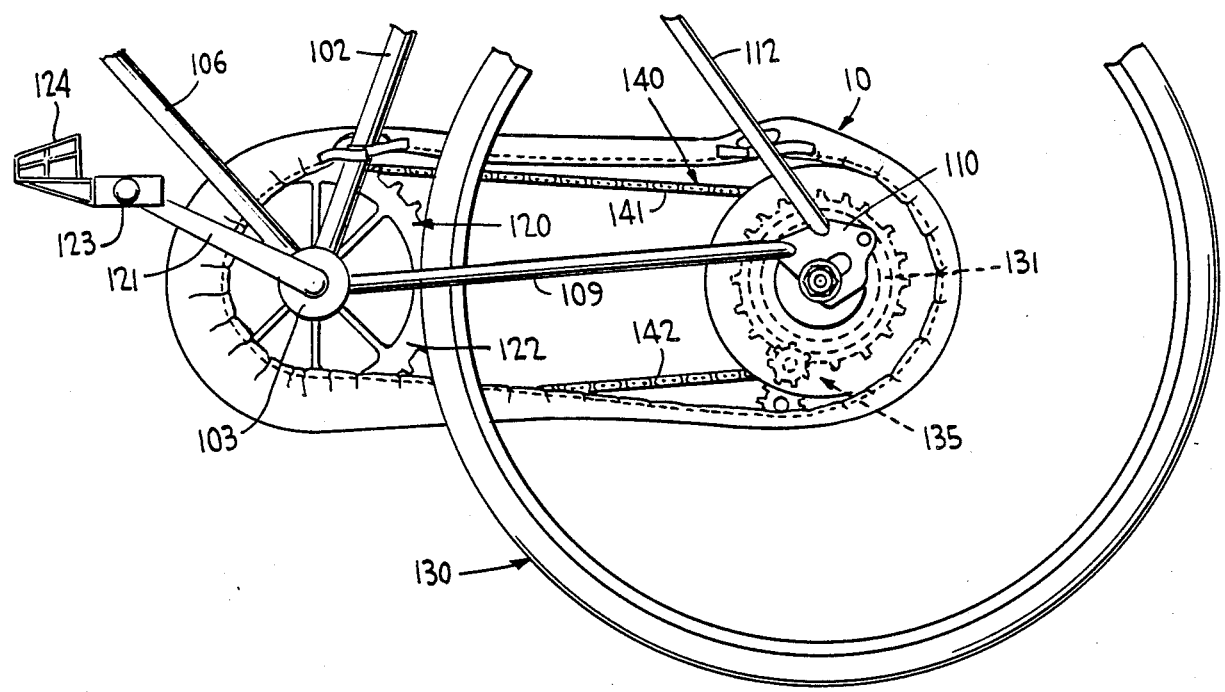

FLEXIBLE PROTECTIVE COVER FOR THE DRIVE TRAIN ELEMENTS OF A BICYCLE

BACKGROUND OF THE INVENTION

1. Field of the Invention

The present invention relates to protective covers which can be mounted on bicycles to protect the drive train elements thereof.

2. The Prior Art

Protective covers for attachment to bicycles to at least partially protect the drive train elements thereof are well known. See, for example, U.S. Pat. Nos. 507,670, 557,267, 594,694, 599,192 and 649,280. However, these covers, which are intended to be permanently attached to the associated bicycle, are generally constructed of rigid materials and are made to be large enough to enable the covered elements of the drive train to be operated within the protective cover. As such, they are either complicated in construction and expensive to produce, or else difficult to attach and detach from the bicycle, often requiring use of accessory hand tools. Although flexible covers for vehicle drive trains are also known—see, for example, U.S. Pat. No. 732,536—these, too, are complicated in construction and are intended to be attached to the vehicle at all times, i.e., even when the drive train elements thereof are operating.

SUMMARY OF THE PRESENT INVENTION

It is an object of the present invention to provide a protective cover for the drive train elements of a bicycle which is simple in construction and inexpensive to fabricate.

It is a further object of the present invention to provide such a protective cover which is made of flexible materials, and thus is easily folded up and stored, and which is tended to be used on the bicycle only when the drive train elements thereof are not being operated, e.g., when the bicycle is being stored or when it is mounted on another vehicle during transport from one location to another.

According to the present invention, the protective cover, which is made of flexible materials, includes an elongated main panel part and a skirt part, the elongated main panel part and the skirt part providing the flexible protective cover with upper and lower elongated peripheral edges and front and rear peripheral edges and the skirt part providing the flexible cover with elasticized upper and lower inner edges and elasticized front and rear inner edges, the flexible protective cover being divided into a front portion which is adapted to be positionable around the drive sprocket(s) of the bicycle (as well as the portion of the endless drive chain associated therewith), a rear portion which is adapted to be positionable around the sprocket gear(s) of the rear wheel (as well as the portion of the endless drive chain associated therewith), and a middle portion which is adapted to fit over the upper and lower runs of the endless drive train. It can also extend over front and/or rear dereilleurs, if the bicycle has multiple drive sprockets and/or multiple sprocket gears. The main panel part includes a generally cross-shaped hole therein at a point within the noted front portion of the cover and through which the right pedal (possibly with toe clip) and right side of the crank arm of the bicycle can pass and the skirt part includes two generally U-shaped openings that are adapted to fit around two different parts of the bicycle frame and attachment means for closing the generally U-shaped openings and fixing the flexible protective cover in position. The attachment means are preferably two elastic attachment bands which extend through channels in the skirt part and which can be connected together at their associated ends, these attachment means being suitably connected to the channels in a stretched condition to provide the elasticity to the inner edges of the flexible protective cover.

A further understanding of the invention will be now had by reference to the attached drawings taken in conjunction with the following discussion.

DESCRIPTION OF THE DRAWINGS

In the drawings,

FIG. 1 shows an elevational view of the right side of a flexible protective cover constructed according to a first preferred embodiment of the present invention, FIG. 2 shows an elevational view of the left side of the flexible protective cover shown in FIG. 1, FIG. 3 shows, on an enlarged scale, a cross sectional view of the flexible protective cover as seen along line 3—3 in FIG. 2, FIG. 4 shows, on an enlarged scale, a cross sectional view of the flexible protective cover as seen along line 4—4 in FIG. 2, FIG. 5 shows a cross sectional view similar to that shown in FIG. 3 of a flexible protective cover according to a second preferred embodiment of the present invention, FIG. 6 shows a cross sectional view similar to that shown in FIG. 4 of the second preferred embodiment of flexible protective cover, FIG. 7 shows an elevational view of the right side of a man's (or boy's) bicycle on which the first preferred embodiment of the flexible protective cover shown in FIG. 1 has been mounted, FIG. 8 shows, on an enlarged scale, a cross sectional view of the bicycle with flexible protective cover as seen along line 8—8 in FIG. 7, and FIG. 9 shows an elevational view of the bicycle with flexible protective cover as seen along line 9—9 in FIG. 8.

DETAILED DESCRIPTION OF THE PREFERRED EMBODIMENT

A first preferred embodiment of flexible protective cover constructed according to the present invention is shown in FIGS. 1-4, this embodiment of flexible protective cover being shown operatively mounted on a typical man's (or boy's) bicycle in FIGS. 7-9. This typical bicycle, generally designated by reference numeral 100, is seen to include a frame 101, a front wheel fork 115, a front wheel 116, a handlebar member 117, a seat member 118, a front driver member 120, a rear wheel 130, a rear derailleur mechanism 135 and an endless drive chain 140. The frame 101 includes a seat tube 102 which extends upwardly from a hub 103, a head tube 104, a top bar 105 which extends from the seat tube to the head tube, an angle bar 106 which extends upwardly from the hub to the head tube, right and left lower struts 107,109 which extend rearwardly of the hub 103 (these lower struts having mounting brackets 108,110 at their respective rearward ends), and right and left seat stays 111,112 which extend upwardly from the respective mounting brackets 108,110 to the respective right and left sides of the top bar 105. The front wheel fork 115, which has the front wheel 116 rotatably attached to its lower end, extends upwardly through the head tube 104, and the handlebar member 117 is attached to the upper end thereof. The seat member 118 is adjustably attached to the upper end of the seat tube 102. The front driver mechanism 120, which includes a crank arm 121, a drive sprocket (chain ring) 122 attached to the crank arm, and pedals 123,125 (having respective toe clips 124,126 attached thereto) attached to the respective right and left ends of the crank arm, is rotatably attached to the hub 103 via the crank arm 121 extending therethrough such that the drive sprocket 122 is located on the right side of the frame 101. The rear wheel 130, which includes multiple sprocket gears 131, is rotatably mounted between the mounting brackets 108,110. The rear derailleur mechanism 135 is mounted on the mounting bracket 108 to extend downwardly therefrom. The endless drive chain 140 wraps around a front portion of the drive sprocket 22, a rear portion of one of the sprocket gears 131, and through the rear derailleur mechanism 135, and it includes upper and lower runs 141 and 142 which respectively extend from one of the sprocket gears 131 to the drive sprocket 122, and from the drive sprocket 122 to the rear derailleur mechanism 135. The drive sprocket 122, the sprocket gears 131, the rear derailleur mechanism 135 and the endless drive chain 140 constitute the drive train elements of this bicycle.

Referring now to FIGS. 1–4, which show the first preferred flexible protective cover embodiment, generally identified by reference numeral 10, it is seen to include an elongated main panel part 20 and a skirt part 30, these parts together providing the flexible protective cover with upper and lower elongated peripheral edges 11,12, front and rear peripheral edges 13,14, upper and lower inner edges 15,16, and front and rear inner edges 17,18. The front and rear peripheral edges 13,14 are generally convexedly curved, while the upper and lower peripheral edges 11,12 converge towards one another to a slight extent as they extend from the rear peripheral edge 14 to the front peripheral edge 13 (actually they are slightly outwardly bowed along their lengths). The flexible protective cover 10 can be considered to be divided into a front portion A which is adapted to extend over most of the drive sprocket 122 of the bicycle 100 (as well as the associated portion of the drive chain 140); a rear portion C which is adapted to extend over most of the sprocket gears 131 and the rear derailleur mechanism 135 (as well as the associated portion of the endless drive chain 140) ; and a middle portion B which is adapted to cover the upper and lower runs 141 and 142 of the endless drive chain 140. As seen in FIG. 1, the elongated main panel part 20 defines an imaginary center line X which extends in its elongated dimension, and it includes a generally cross-shaped opening 21 centered on the imaginary center line X at a point within the front portion A of the flexible protective cover. This generally cross-shaped opening 21 is sufficiently large to enable the pedal 163 and associated toe clip 164 of the bicycle 100 to pass therethrough during the course of mounting the flexible protective cover on the bicycle 100.

The skirt part 30, which provides the upper and lower inner edges 15,16 and the front and rear inner edges 17,18 of the flexible protective cover, includes two generally U-shaped openings 33,34 which extend therein from the upper inner edge 15 of the flexible protective cover. As shown in FIG. 9, these generally U-shaped openings 33,34 are spaced apart so as to respectively fit around the seat tube 102 and the right seat stay 111 of the bicycle 100 with which the flexible protective cover is to be used. As seen in FIGS. 3 and 4, the skirt part 30 includes a main portion 31 and an outer edge portion 32, the outer edge portion 32 being folded over and connected to the main portion 31 so as to provide a first channel 35 which extends between the openings 33,34 along the upper inner edge 15 and a second channel 36 which extends from opening 33 to opening 34 along the remaining inner edges of the flexible protective cover. Extending through the first channel 35 is a first elastic attachment band 37 and extending through the second channel 36 is a second elastic attachment band 38. Each of these bands is sewn in a stretched condition to the main portion 31 and the outer edge portion 32 of the skirt part 30 at the ends of the channels 35,36 adjacent the generally U-shaped openings 33,34 to provide elasticity to the inner edges 15, 16, 17 and 18. In addition, each of the bands has a fastener pad at its opposite ends, each fastener pad having numerous protruding, unitary filaments which can randomly interlock with the numerous protruding, unitary filaments of another similar pad (e.g., a VELCRO ® pad) such that the associated opposite ends of the two elastic attachment bands can be connected together, i.e., when the flexible protective cover 10 is attached to the bicycle 100.

A drainage hole 19 is provided in the flexible protective cover along the lower peripheral edge 12 to allow any water accumulated therein during use to drain out. More than one drainage hole can be provided, if desired. It can be seen that in the first preferred embodiment of the inventive flexible protective cover the main panel part 20 and the skirt part 30 are in fact portions of a single piece of flexible material, which is preferably nylon fabric. The nylon fabric can have a vinyl coating thereon to make it waterproof.

Referring to FIGS. 5 and 6 which show a second preferred embodiment of flexible protective cover according to the invention, the main panel part and the skirt part are seen to be composed of separate pieces of flexible material (e.g., nylon fabric with or without a vinyl coating). In this regard, the main panel part 20' and the skirt part 30' have aligned outer edges which are covered by an outer edge guard 40, the outer lateral portions of which are connected together by stitching 41 which also extends through the outer edges of the parts 20',30' therebetween. It can also be seen that in this second preferred embodiment, the outer edge portion 32' of the skirt part 30' is a separate element that is stitched to the main portion 31' to form the channels 35' and 36'.

In order to be placed in position, the flexible protective cover 10 (its elastic attachment bands 37 and 38 being unconnected) is located on the right side of the bicycle 100 and is oriented such that its front portion A is aligned with the drive sprocket 122 and its rear portion C is aligned with the sprocket gears 131, and it is then moved towards the bicycle such that the pedal 123 with toe clip 124 is moved through the generally cross-shaped opening 21. Then the skirt part 30 or 30' is manipulated until it fits over the drive sprocket 122, the sprocket gears 131, the rear derailleur mechanism 135 and the upper and lower runs of the endless drive chain 140 and such that the generally U-shaped openings 31 and 32 extend around the seat tube 102 and the right seat stay 111. Thereafter, the corresponding ends of the elastic attachment bands 37 and 38 are connected to fixedly position the flexible protective cover in place.

Although two embodiments of the inventive flexible protective cover have been shown and described in detail, it is obvious that various modifications can be made therein and still fall within the scope of the invention. For example, the generally U-shaped openings 33,34 could be spaced apart such that they respectively fit around the angle bar 115 and right seat stay 111 of the associated bicycle. Or the two elastic attachment bands 37,38 could be replaced with other means which provide elasticity to the inner edges 15, 16, 17 and 18 of the flexible protective cover and other means to operably close the generally U-shaped openings 33,34. Or the flexible protective cover could be adapted to fit over multiple drive sprockets mounted on the crank arm 121, together with an associated front derailleur mechanism, or else it could be adapted to be used with a bicycle which does not include any derailleur mechanisms at all (in which case the rear wheel would have only one sprocket gear attached thereto).

I claim:

1. A flexible protective cover adapted for use with a bicycle which is not in use and which includes a frame having a right side and a left side, a front wheel, a rear wheel having at least one sprocket gear, a front driver mechanism and an endless drive chain, the frame including a hub, a seat tube which extends upwardly from said hub, an angle bar which extends upwardly from said hub, right and left lower struts which extend rearwardly of said hub, said right and left lower struts having respective right and left mounting brackets at their rearward ends, and right and left seat stays which extend upwardly from said respective mounting brackets; said front driver mechanism including a crank arm which extends through said hub, at least one drive sprocket attached to said crank arm so as to be located on the right side of said frame, and pedals attached to the opposite right and left ends of said crank arm; said rear wheel being attached between said mounting brackets, said endless drive chain being wrapped around a portion of said at least one drive sprocket, said at least one sprocket gear, and having upper and lower runs, said flexible protective cover comprising an elongated main panel part and a skirt part, said elongated main part and said skirt part providing said flexible protective cover with upper and lower elongated pepheral edges and front and rear peripheral edges and said skirt part providing said flexible protective cover with elasticized upper and lower inner edges and elasticized front and rear inner edges, said flexible protective cover bing divided into a front portion which is adapted to extend over most of said drive sprocket(s) of the bicycle and the associated portion of the endless drive chain, a rear portion which is adapted to extend over most of said sprocket gear(s) and the associated portion of the endless drive chain, and a middle portion which is adapted cover the upper and lower runs of the endless drive chain, said elongated main panel part having an opening therein through which the pedal attached to the right side of the crank arm can pass, and said skirt part including two generally U-shaped openings for respectively extending around said seat tube and said seat stay of said bicycle frame and attachment means for closing said two generally U-shaped openings.

2. A flexible protective cover as defined in claim 1, wherein said front and rear peripheral edges are convexly curved.

3. A flexible protective cover as defined in claim 2, wherein said upper and lower peripheral edges converge towards one another to a slight extent as they extend from said rear peripheral edge to said front peripheral edge.

4. A flexible protective cover as defined in claim 3, wherein said upper and lower peripheral edges are slightly outwardly bowed along their lengths.

5. A flexible protective cover as defined in claim 1, wherein said main panel part defines an imaginary center line in its elongated direction and said opening therein is centered on said imaginary center line and is located within said front portion of said flexible protective cover.

6. A flexible protective cover as defined in claim 5, wherein said opening in said main panel part is generally cross-shaped.

7. A flexible protective cover as defined in claim 1, wherein said main panel part and said skirt part are portions of single piece of flexible material.

8. A flexible protective cover as defined in claim 1, wherein said main panel part and said skirt part are composed of separate pieces of flexible material, wherein each of said main panel part and said skirt part have aligned outer edges, and wherein said flexible protective cover includes an edge guard which has opposite lateral portions that are bent over the aligned outer edges of said main panel part and said skirt part, and stitching which extends through said lateral portions and the outer edges of said main panel part and said skirt part located therebetween to connect them together.

9. A flexible protective cover as defined in claim 1, wherein said main panel part and said skirt part are made of nylon fabric.

10. A flexible protective cover as defined in claim 9, wherein said nylon fabric has a vinyl coating thereon to make it waterproof.

11. A flexible protective cover as defined in claim 1, wherein the bicycle with which the flexible protective cover is useful includes a rear derailleur mechism and wherein said rear portion of said flexible protective cover is dimensioned to cover said rear derailleur mechanism.

12. A flexible protective cover adapted for use with a bicycle which is not in use and which includes a frame having a right side and a left side, a front wheel, a rear wheel having at least one sprocket gear, a front driver mechanism and an endless drive chain, the frame including a hub, seat tube which extends upwardly from said hub, an angle bar which extends upwardly from said hub, right add left lower struts which extend rearwardly of said hub, said right and left lower struts having respective right and left mounting brackets at their rearward ends, and right and left seat stays which extend upwardly from said respective mounting brackets; said front driver mechanism including a crank arm which extends through said hub, at least one drive sprocket attached to said crank are so as to be located on the right side of said frame, and pedals attached to the opposite right and left ends of said crank arm; said rear wheel being attached between said mounting brackets, said endless drive chain being wrapped around a portion of said at least one drive sprocket, said at least one sprocket gear, and having upper and lower runs, said flexible protective cover comprising an elongated main panel part and a skirt part, said elongated main part and said skirt part providing said flexible protective cover with upper and lower elongate peripheral edges and fron and rear peripheral edges and said skirt.part providing said flexible protective cover with elasticized upper and lower inner edges and elasticized front and rear inner edges, said flexible protective cover being divided into a front portion which is adapted to extend over most of said drive sprocket(s) of the bicycle and the associated portion of the endless drive chain, a rear portion which is adapted to extend over most of sAid sprocket gear(s) and the associated portion of the endless drive chain, and a middle portion of the endless upper and lower runs of the endless drive chain, said elongated main panel part having an opening therein through which the pedal attached to the right side of the crank arm can pass, and said skirt part including two generally U-shaped openings for extending around separate parts of said frame and attachment means around separate parts of said frame and attachment flexible protective cover including at least one drainage hole located along its lower peripheral edge.

13. A flexible protective cover adapted for use with a bicycle which is not in use and which includes a frame having a right side and a left side, a front wheel, a rear wheel having at least one sprocket gear, a front driver mechanism and an endless drive chain, the frame including a hub, a seat tube which extends upwardly from said hub, an angle bar which extends upwardly from said hub, right and left lower struts which extend rearwardly of said hub, said right and left lower struts having respective right and left mounting brackets at their rearward ends, and right and left seat stays which extend upwardly from said respective mounting brackets; said front driver mechanism including a crank arm which extends through said hub, at least one drive sprocket attached to said crank arm so as to be located on the right side of said frame, and pedals attached to the opposite right and left ends of said crank arm; said rear wheel being attached between said mounting brackets, said endless drive chain being wrapped around a portion of said at least one drive sprocket, said at least one sprocket gear, and having upper and lower runs, said flexible protective cover comprising an elongated main panel part and a skirt part, said elongated main part and said skirt part providing said flexible protective cover with upper and lower elongated peripheral edges and front and rear peripheral edges and said skirt part providing said flexible protective cover with elasticized upper and lower inner edges and elasticized front and rear inner edges, said flexible proteciive cover being divided into a front portion which is adapted to extend over most of said drive sprocket(s) of the bicycle and the associated portion of the endless drive chain, a rear portion which is adapted to extend over most of said sprocket gear(s) and the associated portion of the endless drive chain, and a middle portion which is adapted to cover the upper and lower runs of the endless drive chain, said elongated main panel part having an opening therein through which the Pedal attached to the right side of the crank arm can pass, and said skirt part including two generally U-shaped openings for extending around separate parts of said frame and attachment means for closing said two generally U-shaped openings; wherein said skirt part provides a first channel which extends along the upper inner edge of said flexible protective cover between said two generally U-shaped openings and a second channel which extends around the rest of the inner edges thereof, and wherein said skirt part includes a first elastic attachment band which extends through said first channel and a second elastic attachment band which extends through said second channel, said first and second attachment bands being connected to the skirt part to provide elasticity to said upper, lower, front and rear edges of said flexible protective cover and each having opposite associated ends which can be connected together to provide said attachment means for closing said two generally U-shaped openings.

14. A flexible protective cover as defined in claim 13, wherein the opposite ends of said first and second elastic attachment band have fastener pads attached thereto.

* * * * *